United States Patent [19] [11] 4,214,073

Passagne et al. [45] Jul. 22, 1980

[54] POLY-(CARBONATE-URETHANE)-TRIOLS AND PREPARATION THEREOF

[75] Inventors: Claude G. Passagne, Champigny sur Marne; Jean-Pierre G. Senet, Melun; Remy R. Lippler; Jacques Plazanet, both of Bergerac, all of France

[73] Assignee: Societe Nationale des Poudres et Explosifs, Paris, France

[21] Appl. No.: 43,340

[22] Filed: May 29, 1979

Related U.S. Application Data

[62] Division of Ser. No. 855,963, Nov. 30, 1977, Pat. No. 4,165,423.

[51] Int. Cl.² .................................................. C08G 18/00
[52] U.S. Cl. ..................................... 528/369; 260/463; 528/370
[58] Field of Search ........................................ 528/369

[56] References Cited

U.S. PATENT DOCUMENTS

| 2,321,586 | 6/1943 | D'Alelio ............... | 528/369 |
|---|---|---|---|
| 3,716,572 | 2/1973 | Moore et al. .......... | 528/370 |
| 3,873,553 | 3/1975 | Hearsey ............... | 528/370 |
| 3,950,285 | 3/1975 | Wolgemuth ........... | 528/370 |

FOREIGN PATENT DOCUMENTS 1211557  3/1960  France .

*Primary Examiner*—Maurice J. Welsh
*Attorney, Agent, or Firm*—Bucknam and Archer

[57] ABSTRACT

Novel poly-(carbonate-urethane)-triols which are liquid at room temperature, have a molecular weight of less than 5000, and are of the formula:

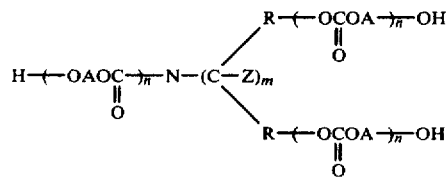

wherein A is an alkylene or cycloalkylene group, R is an alkylene group having up to 4 carbon atoms, Z is an alkyl group having up to 4 carbon atoms, n is a number representing the degree of polymerization, and m is 0 or 1.

These poly-(carbonate-urethane)-triols are prepared by a transesterification reaction between an alkyl or aryl carbonate, at least one aliphatic or cycloaliphatic diol, and a primary or secondary dialkanolamine, the dialkanolamine being present in such an amount that there is statistically one molecule of the dialkanolamine per polymer chain.

The poly-(carbonate-urethane)-triols are useful for the production of aminoplast resins which can be used, for example, as stoving lacquers.

2 Claims, No Drawings

POLY-(CARBONATE-URETHANE)-TRIOLS AND PREPARATION THEREOF

This is a division of application Ser. No. 855,963 filed Nov. 30, 1977 and now U.S. Pat. No. 4,165,423, issued Aug. 21, 1979.

This invention is concerned with novel poly-(carbonate-urethane)-triols, with a process for their preparation, and with the use of such compounds to form aminoplast resins.

It is known from French Pat. No. 1,155,285 that the transesterification of a diol/triol mixture with an aliphatic carbonate leads to cross-linked polyhydroxylated polycarbonates which, by reaction with diisocyanates, give polymers of increased density and strength. The production of polyhydroxylated polycarbonates by the transesterification of a diol/triol mixture with an aliphatic or aromatic carbonate is also described in French Pat. Nos. 2,010,777 and 2,037,006. These polyhydroxylated polycarbonates are described as being solid compounds or viscous oils. French Pat. No. 1,211,557 describes polyhydroxylated polycarbonates obtained by the transesterification of phenols with aminoalcohols and particularly with dialkanolamines; the polycarbonates thus obtained are solids.

We have now found that liquid poly-(carbonateurethane)-triols having a molecular weight of less than 5,000 can be obtained by such a transesterification reaction when the latter is carried out in the presence of a specified amount of a dialkanolamine. The compounds so obtained are novel.

According to one aspect of the present invention, there is provided a poly-(carbonate-urethane) triol of the formula:

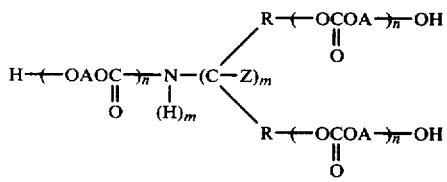

in which A is an alkylene or cycloalkylene group, R is an alkylene group having up to 4 carbon atoms, Z is an alkyl group having up to 4 carbon atoms, n is a number representing the degree of polymerisation, and m is 0 or 1, the poly-(carbonate-urethane)-triol having a molecular weight of less than 5000 and being liquid.

In the above formula, it is to be understood that when m is 0, the $-R-(-OCOOA)_{\overline{n}}$ OH groups are directly attached to the nitrogen atom by the available valencies of the latter. In this case, the above formula could be rewritten:

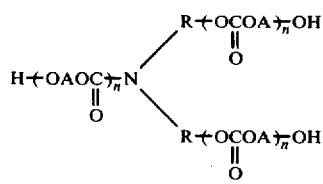

According to another aspect of the invention, there is provided a process for the preparation of a poly-(carbonate-urethane)-triol, which comprises reacting an alkyl or aryl carbonate with an aliphatic or cycloaliphatic diol and a primary or secondary dialkanolamine in order to effect transesterification of the carbonate, the dialkanolamine being present in such an amount that there is statistically one molecule of the dialkanolamine per polymer chain, whereby there is obtained a liquid poly-(carbonate-urethane)-triol having a molecular weight of less than 5000.

As indicated, in carrying out this process, the proportion of dialkanolamine used is such that there is statistically one molecule of amine per polymer chain; although we do not wish to be restricted by theoretical considerations, it is thought that there is, in fact, one molecule of amine per polymer chain in the product obtained.

We have observed that if a primary dialkanolamine is used, only one of the two hydrogen atoms is reactive in the transesterification reaction, the other two active hydrogen atoms coming from the hydroxyl functions. Therefore, whether a primary or a secondary dialkanolamine is used, the resulting poly-(carbonate-urethane)-triol contains statistically only a single urethane function per polymer chain, to which function three polycarbonate chains are grafted, each chain carrying a hydroxyl function at the other end.

Suitable primary or secondary dialkanolamines for use in the process according to the invention are dialkanolamine of the formula:

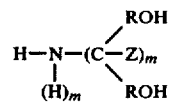

in which R is an alkylene group having up to 4 carbon atoms, Z is an alkyl group having up to 4 carbon atoms, and m is 0 or 1. It is to be understood that in the above formula, when m is 0, the —ROH groups are directly attached to the nitrogen atom by the available valencies of the latter so that the formula could be rewritten, in this case, as follows:

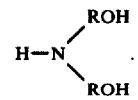

The dialkanolamine used in the process should be heat stable and have a boiling point at normal pressure which is at least 30° C. higher than that of the alkanol or phenol corresponding to the transesterifying agent used. Diethanolamine, 1,1-di-(hydroxymethyl)-1-aminopropane, 1,1,-di-(hydroxymethyl)-1-aminoethane or N,N-di-(2-hydroxypropyl)-amine are particularly preferred.

As also stated above, at least one aliphatic or cycloaliphatic diol is used, it being understood that mixtures of aliphatic or cycloaliphatic diols can be used. The aliphatic or cycloaliphatic diol may optionally be substituted by one or more alkyl radicals and the hydrocarbon chain of the diol may optionally contain ether or thioether linkages. The hydrocarbon chain of the diol preferably comprises from 4 to 10 carbon atoms. Butane-1,4-diol, butane-1,3-diol, pentane-1,5-diol, neopentyl glycol, hexane-1,6-diol, heptane-1,7-diol, octane-1,8-diol, 2,2,4-trimethylhexane-1,6-diol, di-(ethylene glycol), tri-(ethylene glycol), 2,2,4,4-tetramethylcyclobutane-1,3-diol and 1,4-dimethanolcyclohexane are particularly preferred.

The transesterifying agent used according to the present invention may be any of the conventional alkyl or aryl carbonates, which are known to those skilled in the art, ethyl carbonate, phenyl carbonate and naphthyl carbonate being particularly preferred.

When the transesterifying agent is an alkyl carbonate, conventional transesterification techniques, which are known to those skilled in the art, are advantageously used.

When the transesterifying agent is an aryl carbonate, the transesterification is preferably carried out in conventional manner with a basic catalyst. In general, the diol or mixture of diols and the dialkanolamine are brought together with the transesterifying agent and a basic catalyst which is an alkali metal alcoholate, preferably sodium methylate or sodium phenate. The mixture comprising these constituents is heated and stirred for a period of from 4 to 6 hours, at a temperature of from 120° to 150° C., under a pressure of from 100 to 30 mm of mercury. When about 90% of the theoretical amount of phenol has been collected, the reaction is completed by raising the temperature to about 190° C. and/or by reducing the pressure to about 15 mm of mercury. These conditions are maintained until the evolution of phenol has ceased. The system is then swept with nitrogen for a period of from half an hour to one hour under a pressure of about 10 mm of mercury, the catalyst having been previously neutralised with an aqueous solution of acid or acid chloride.

It is preferred to purify the poly-(carbonate-urethane)-triol obtained in this way, either by simple stripping under reduced pressure or, if desired, by using the technique of purification with water which is described in French Pat. No. 2,294,198.

Because they are in the liquid state at room temperature, the poly-(carbonate-urethane)-triols according to the invention enable modified aminoplast resins to be readily obtained by reaction, without fusion or dissolution, with etherified melamineformaldehyde condensates of the formula:

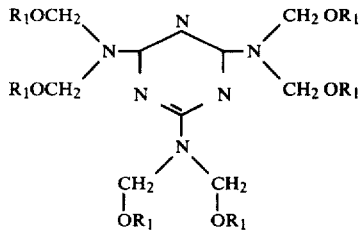

in which $R_1$ is an alkyl group having up to 4 carbon atoms.

The poly-(carbonate-urethane)-triols according to the invention exhibit very good compatability with the above-mentioned condensates and are very easy to use because of their particularly low viscosity. The poly-(carbonate-urethane)-triols according to the invention are preferably partially esterified whilst hot with about 1% by weight of citric acid or trimellitic acid before being reacted with the melamineformaldehyde condensate. The resins thus obtained have very high gloss and can be filled with coloured pigments. They are suitable for all stoving lacquer applications and particularly for coating small household electrical equipment.

In order that the invention may be more fully understood, the following examples are given by way of illustration only:

EXAMPLE 1

This example relates to the preparation of a poly-(carbonate-urethane)-triol by transesterification between diphenyl carbonate, diethanolamine and diethylene glycol.

The apparatus used consisted of:

A 5 liter double-walled glass reactor provided with an efficient stirrer, a thermometer and a stainless steel dip tube; a double-walled distillation column (effective length 320 mm, diameter 20 mm) packed with Raschig rings; and a vacuum control instrument.

98.7 g (0.94 mol) of diethanolamine, 1,431 g (13.5 mols) of di-(ethylene glycol) and 2,889 g (13.5 mols) of molten diphenyl carbonate were introduced into the reactor. The mixture was heated to 120° whilst stirring, and 100 mg of sodium methylate were added. The reaction mixture was then heated to 140° C. under 28 mm Hg. The actual transesterification started at this stage, and the phenol started to distil off.

After 5 hours, about 90% of the theoretical amount of phenol had been collected. The pressure was reduced to 25 mm Hg and the temperature was raised to 190° C. These conditions were maintained until the evolution of phenol had ceased.

The temperature of the reaction mixture was reduced to 175° C. and the pressure was maintained at 180 mm Hg. 100 ml of a 5% aqueous solution of acetic acid and 400 ml of distilled water were introduced slowly through the dip tube. The temperature of the mixture fell to 90° C. The temperature was allowed to return to 175° C., whilst reducing the pressure from 180 to 2 mm Hg.

1,870 g of an oil having the following characteristics were obtained:

OH content: 1.57 equivalent/kg
molecular weight: 1,910
free phenol content: 0.18%
total phenol content: 0.35%
Brookfield viscosity at 25° C.: 36,000 cP.

By way of comparison, an aliphatic polycarbonate triol having a molecular weight of about 2,000 was prepared in the same apparatus and by an analogous method of operation starting from 132.6 g (0.989 mol) of trimethylolpropane, 1,484 g (14 mols) of di-(ethylene glycol) and 2,996 g (14 mols) of diphenyl carbonate. In spite of the presence of the ether bridges of the —(CH$_2$-)$_2$—O—(CH$_2$)$_2$— groups, the Brookfield viscosity at 25° C. of the product obtained was 870,000 cP, which was therefore markedly greater than that of the preceding product.

EXAMPLE 2

This example relates to the preparation of a poly-(carbonate-urethane)-triol by transesterification between diphenyl carbonate, diethanolamine and a mixture of butane-1,4-diol and hexane-1,6-diol in such a ratio that the final poly-(carbonate-urethane)-triol was equivalent to a mixture of 50% by weight of poly-(carbonate-urethane)-triol derived from diethanolamine and butane-1,4-diol alone, and of 50% by weight of poly-(carbonate-urethane)-triol derived from diethanolamine and hexane-1,6-diol alone.

1.100 kg (10.476 mols) of diethanolamine, 3.230 kg (35.89 mols) of butane-1,4-diol, 3.411 kg (28.91 mols) of hexane-1,6-diol and 13.867 kg (64.80 mols) of diphenyl carbonate were introduced into a 20 liter reactor heated by a thermostat-controlled oil bath and provided with an anchor stirrer, a packed distillation column and a base valve. The mixture was heated to 80° C., whilst stirring, and 1 g of sodium methylate was added. The reaction mixture was heated to 150° C. under 110 mm Hg. The actual transesterification started at this stage and the phenol started to distil off.

The pressure was progressively reduced to 15 mm Hg over 6 hours, the temperature being kept at 150° C. 12.18 kg of phenol were collected, this being 100% of theory.

The basic catalyst was neutralised by the addition of azelayl chloride and the system was swept with nitrogen for 25 minutes at 180° C. under 25 mm Hg.

With the temperature of the reaction mixture at 170° C., the pressure was maintained at 200 mm Hg and 1.85 liter of water were introduced through the base valve over about 25 minutes. A stream of dry nitrogen was passed for 15 minutes, the temperature being kept at 150° C. and the pressure at 25 mm Hg. 8.6 kg of a clear fluid oil having the following characteristics were thus obtained.

OH content: 2.58 equivalent/kg
free phenol content: 0.08%
water content: 0.04%

EXAMPLE 3

This example describes the preparation of a white stoving lacquer from the poly-(carbonate-urethane)-triol described in Example 1. This poly-(carbonate-urethane)-triol was partially esterified with trimellitic acid according to the following formulation:

poly-(carbonate-urethan)-triol: 1,000 parts by weight
trimellitic acid: 83 parts by weight The trimellitic acid was introduced into the liquid polycarbonate at room temperature, whilst stirring. The esterification was carried out at 200° C. for about 4 hours.

The poly-(carbonate-urethane)-triol esterified in this way was used in the following formulation:

esterified poly-(carbonate-urethane)-triol: 26.4 parts by weight.
RNCX titanium dioxide (obtained from Kronos): 23 parts by weight
aqueous dispersion of methylated melamineformaldehyde condensate having 68% solids content (Luwipal 8334 from BASF): 28 parts by weight
methyl ethyl ketone: 1.5 parts by weight
ethyl glycol acetate: 20.3 parts by weight.

The titanium oxide was dispersed in the poly-(carbonate-urethane)-thiol with 1.5 parts of methyl ethyl ketone by means of a micro-element grinder until a fineness of greater than 9½ was obtained on the North gauge. The formulation was then completed with the melamine and the ethyl glycol acetate.

The composition made in this way had a viscosity of 60 seconds in an AFNOR No. 4 cup. Application of the composition was carried out with a spray gun on bare sheet metal which had been degreased with trichloroethylene in the cold. After a period of preliminary drying for 10 minutes at room temperature, the coated sheet was placed in a convection oven for 20 minutes at a temperature of 130° C. The dry coating had a thickness of 75 microns.

The gloss was 39%, as measured on a Gardner glossmeter at an incidence of 45°. The Persoz pendulum hardness was 130 seconds for a thickness of 75 microns. (Persoz hardness corresponds to the damping time required for a pendulum to swing from an amplitude of 12° to 4°, according to AFNOR Standard Specification T 30/016 of May 1965, and Gardner gloss corresponds to the percentage of light reflected at an incidence of 45°, according to ASTM Standard Specification D 523-62 T.)

What is claimed is:

1. A resin obtained by reaction of a poly-(carbonate-urethane)-triol of the formula:

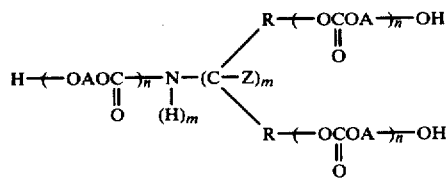

wherein A is an alkylene or cycloalkylene group, R is an alkylene group having up to 4 carbon atoms, Z is an alkyl group having up to 4 carbon atoms, n is a number representing the degree of polymerisation, and m is an integer selected from 0 and 1, said poly-(carbonate-urethane)-triol having a molecular weight of less than 5000 and being liquid, with an etherified melamine-formaldehyde condensate of the formula:

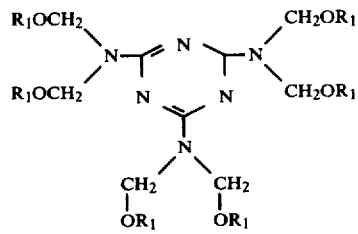

where $R_1$ is an alkyl group having up to 4 carbon atoms.

2. A resin according to claim 1, wherein said poly-(carbonate-urethane)-triol is partially esterified, prior to reaction with said condensate, with an acid selected from the group consisting of citric acid and trimellitic acid.

* * * * *